(12) United States Patent
De Vos et al.

(10) Patent No.: US 6,234,300 B1
(45) Date of Patent: May 22, 2001

(54) METHOD AND DEVICE FOR SUPPLYING, DISCHARGING AND TRANSFERRING OF OBJECTS, LIKE FRUITS

(75) Inventors: Marinus De Vos; Jan Marinus Van Arkel, both of Tricht; Jacob Hendrik De Dreef, Waardenburg, all of (NL)

(73) Assignee: De Greff's Wagen -, Carrosserie - en Machinebouw B.V. (NL)

( * ) Notice: Subject to any disclaimer, the term of this patent is extended or adjusted under 35 U.S.C. 154(b) by 0 days.

(21) Appl. No.: 09/180,415

(22) PCT Filed: May 7, 1997

(86) PCT No.: PCT/NL97/00260

§ 371 Date: Nov. 6, 1998

§ 102(e) Date: Nov. 6, 1998

(87) PCT Pub. No.: WO97/42112

PCT Pub. Date: Nov. 13, 1997

(30) Foreign Application Priority Data

May 7, 1996 (NL) .................................................... 1003057

(51) Int. Cl.[7] ................................................. B65G 47/26
(52) U.S. Cl. .................. 198/459.8; 198/370.03; 198/370.04; 198/470.1; 198/803.7
(58) Field of Search ................ 198/370.03, 370.04, 198/370.05, 470.1, 459.1, 459.8, 803.7; 209/912

(56) References Cited

U.S. PATENT DOCUMENTS

| 3,330,400 | * | 7/1967 | Alexander | 198/470.1 |
| 3,837,474 | * | 9/1974 | Brooke | 198/803.7 |
| 4,262,795 | | 4/1981 | Hecker | 198/479 |
| 4,488,637 | | 12/1984 | Loeffler | 198/653 |

FOREIGN PATENT DOCUMENTS

| 0230583A2 | 8/1987 | (EP) . |
| 0647561A1 | 4/1995 | (EP) . |
| 0687508A1 | 12/1995 | (EP) . |

* cited by examiner

Primary Examiner—Joseph E. Valenza

(57) ABSTRACT

Apparatus for transporting and/or classifying objects such as fruits, comprising: a supply conveyor (11) for supplying the objects at a relatively small pitch; a discharge conveyor (13) for discharging the objects at a relatively large pitch, for instance for classification purposes; and a transferring device (12) for transferring the objects from the first conveyor (11) to the second conveyor (13), wherein the speed of forward movement of the transferring device is adapted to the speed of the discharge conveyor and wherein the transferring device comprises gripper members (17) arranged in pairs for gripping the objects.

10 Claims, 12 Drawing Sheets

METHOD AND DEVICE FOR SUPPLYING, DISCHARGING AND TRANSFERRING OF OBJECTS, LIKE FRUITS

Known for instance from the European patent application EP-A-0687508 is an apparatus wherein fruits are clamped between grippers, lifted by these grippers, weighed during the lifting and classified on the basis of the weighing in that the fruits are released from the grippers at predetermined locations. Such a classifying apparatus requires a large number of grippers, for instance along a length of as much as 40 metres, which makes this construction expensive.

The present invention comprises an apparatus for transporting and/or classifying objects such as fruits, comprising:
- a supply conveyor for supplying the objects at a relatively small pitch;
- a discharge conveyor for discharging the objects at a relatively large pitch which is in any case no smaller than the small pitch, for instance for classification purposes; and
- a transferring device for transferring the objects from the first conveyor to the second conveyor, wherein the speed of forward movement of the transferring device is adapted to the speed of the discharge conveyor and wherein the transferring device comprises gripper members arranged in pairs for gripping the objects.

Using the apparatus according to the present invention the speed of the supply conveyor is utilized optimally—the fruits are supplied for instance at a speed of 8 units per second—while the discharge conveyor consists of transporting members, such as cup-like fruit receiving members, which have a larger mutual pitch, wherein damage to the fruit is prevented during the transfer between supply conveyor and discharge conveyor since it does not undergo a falling movement. In a further preferred embodiment the fruits can likewise be rotated through for instance a half-turn.

A discharge conveyor with cup-like receiving members is per se known from the European patent application EP-A-062007, wherein the fruit falls or rolls some distance downward during transfer between supply conveyor and discharge conveyor, which can result in damage to the fruit.

The gripper members preferably comprise substantially stiff arms and protective sleeves of soft material to further prevent damage to fruit.

In a further preferred embodiment of the apparatus according to the invention at least one cross conveyor is arranged below the transferring device in order to enable separate discharge of fruit less suitable for consumption and/or double fruits prior to classification.

The apparatus is preferably provided in a further preferred embodiment with rotating means for viewing the fruits both before and after the transferring device, for instance for quality control purposes.

Further advantages, features and details of the present invention will be elucidated in the light of the following description of a preferred embodiment thereof with reference to the annexed drawings, in which.

Figure 1:
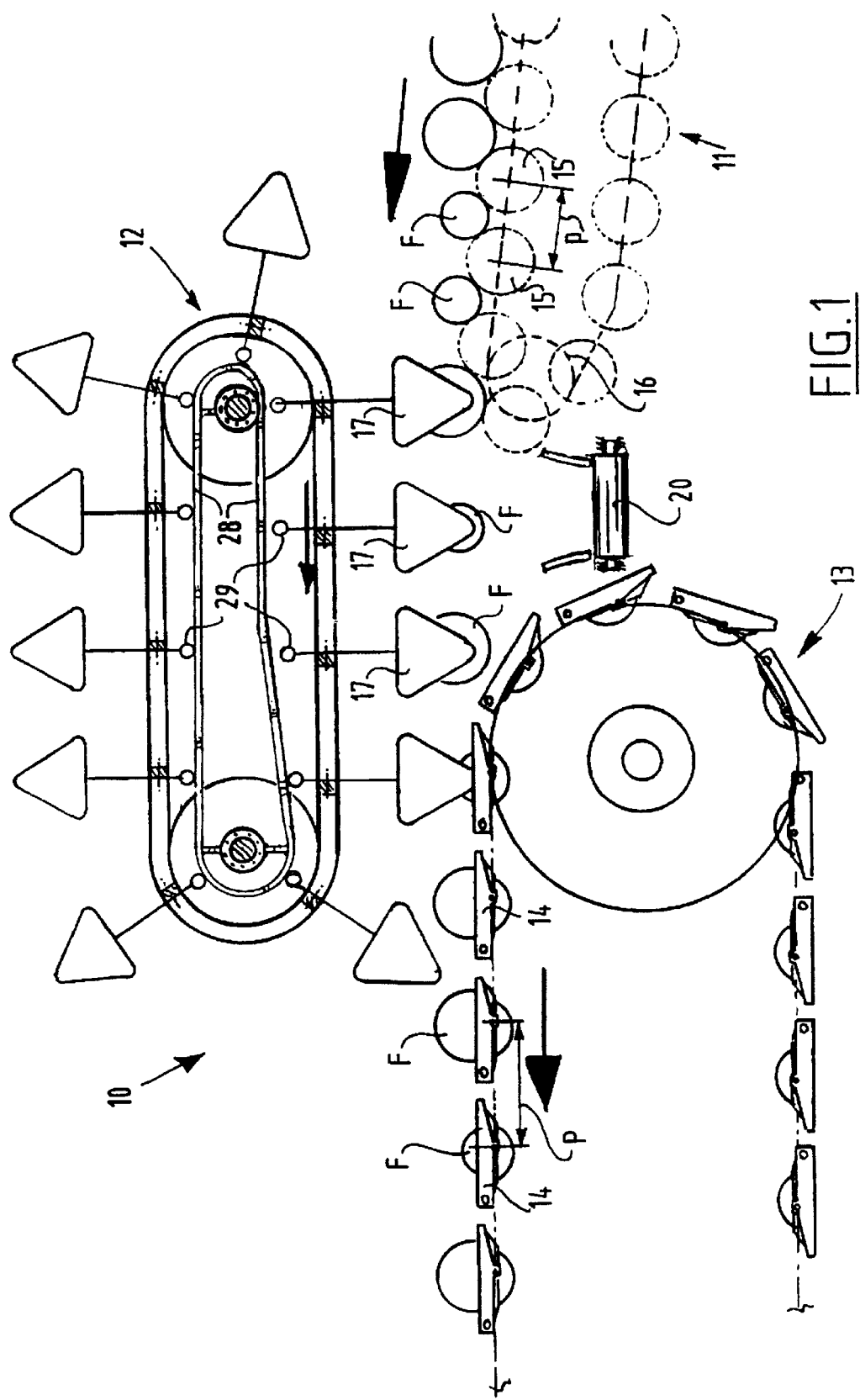
FIG. 1 shows a schematic side view of a method and apparatus according to the present invention.

A preferred embodiment 10 (FIG. 1, 2) of an apparatus according to the present invention comprises a supply roller conveyor 11, transferring means 12 and a discharge conveyor 13 which comprises tiltable cups 14 in which fruits F of different size are placed at relatively large pitch distance P. From conveyor 13 the fruits F are sorted according to weight and the like in a manner not shown - each cup filled with a fruit is weighed in the discharge conveyor using weight measuring means, for instance a measuring bridge.

The fruits F are supplied on a driven roller conveyor, wherein the rollers 15 for instance comprise diabolo-shaped brush elements (see FIG. 2) wherein the pitch distance p is smaller than the pitch distance P of discharge conveyor 13. Close to reversing wheel 16 of supply conveyor 11 the fruits F are gripped one at a time by gripper elements 17 of transferring device 12, wherein the fruits are as it were transferred in a continuous horizontal path to the discharge conveyor 13, wherein the fruits are prevented from making a falling movement during the transfer between supply conveyor 11 and discharge conveyor 13.

The diabolo-shaped brush elements are preferably applied in the case of vulnerable fruits such as soft apples, pears and the like; in the case of harder fruits use is usually made of diabolo-shaped elements without brushes.

In the embodiment shown in FIGS. 1 and 2 a cross conveyor 20 for discharge of unsuitable fruit, or for instance double fruit, is also arranged in the area between supply conveyor 11 and discharge conveyor 13 below gripper elements 17. If these elements are moved apart by a control (not shown) on the basis of an indication by operative personnel or automatic identifying means who/which have established that a fruit is not suitable for consumption, such a fruit can be discharged by the cross conveyor.

Figure 2:
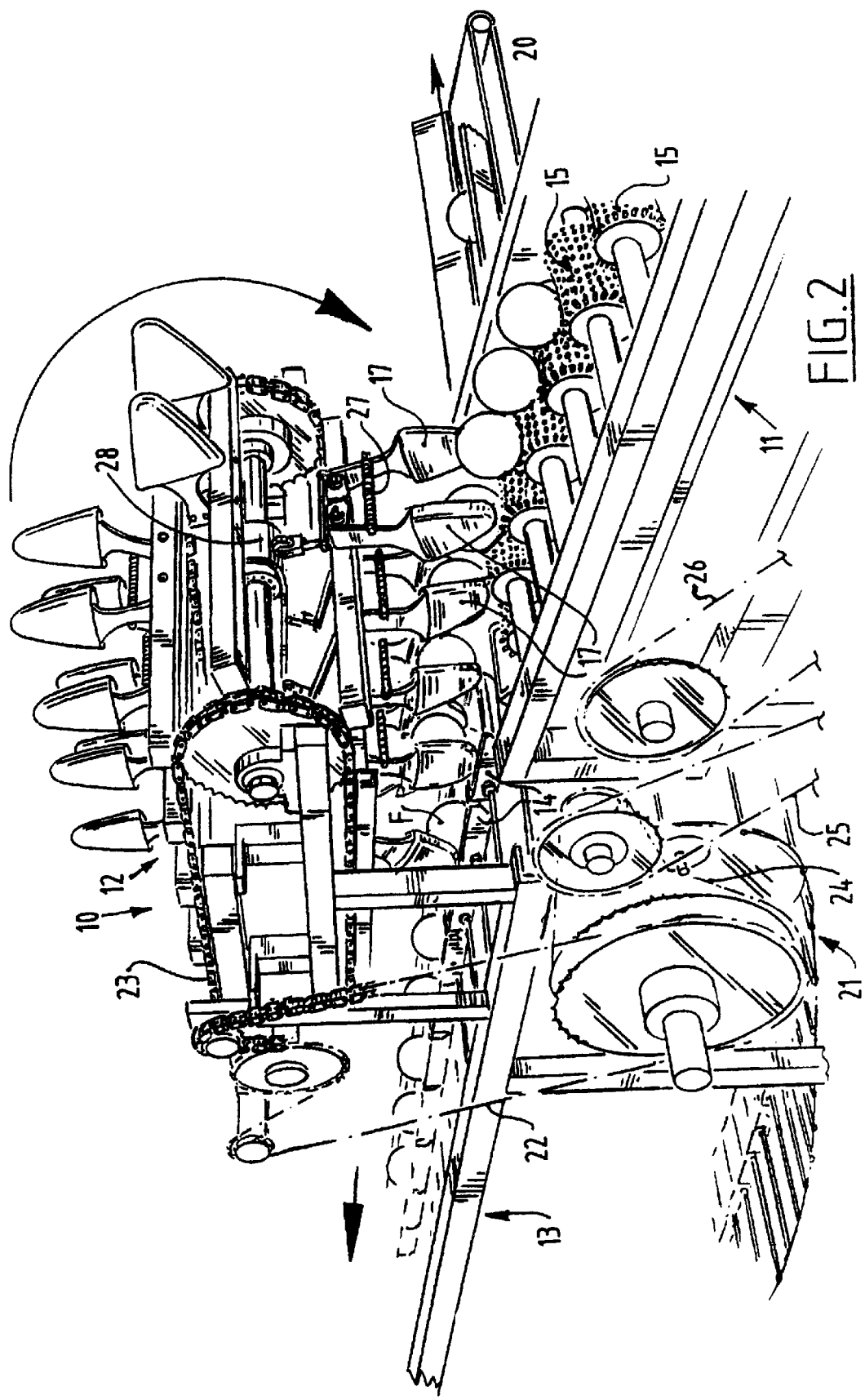
FIG. 2 shows a view in perspective of the apparatus of FIG. 1.

In addition to the components shown in FIG. 1, FIG. 2 also depicts a number of components in more detail, for instance the drive motor 21 for the transporting means 11, 12 and 13, the movement of which is transmitted in the shown preferred embodiment via chains 22, 23, 24, 25 and 26, whereby the drives of transporting means 11, 12 and 13 are synchronized. It is of course equally conceivable to have synchronization take place in electronically controlled manner.

Figure 3:
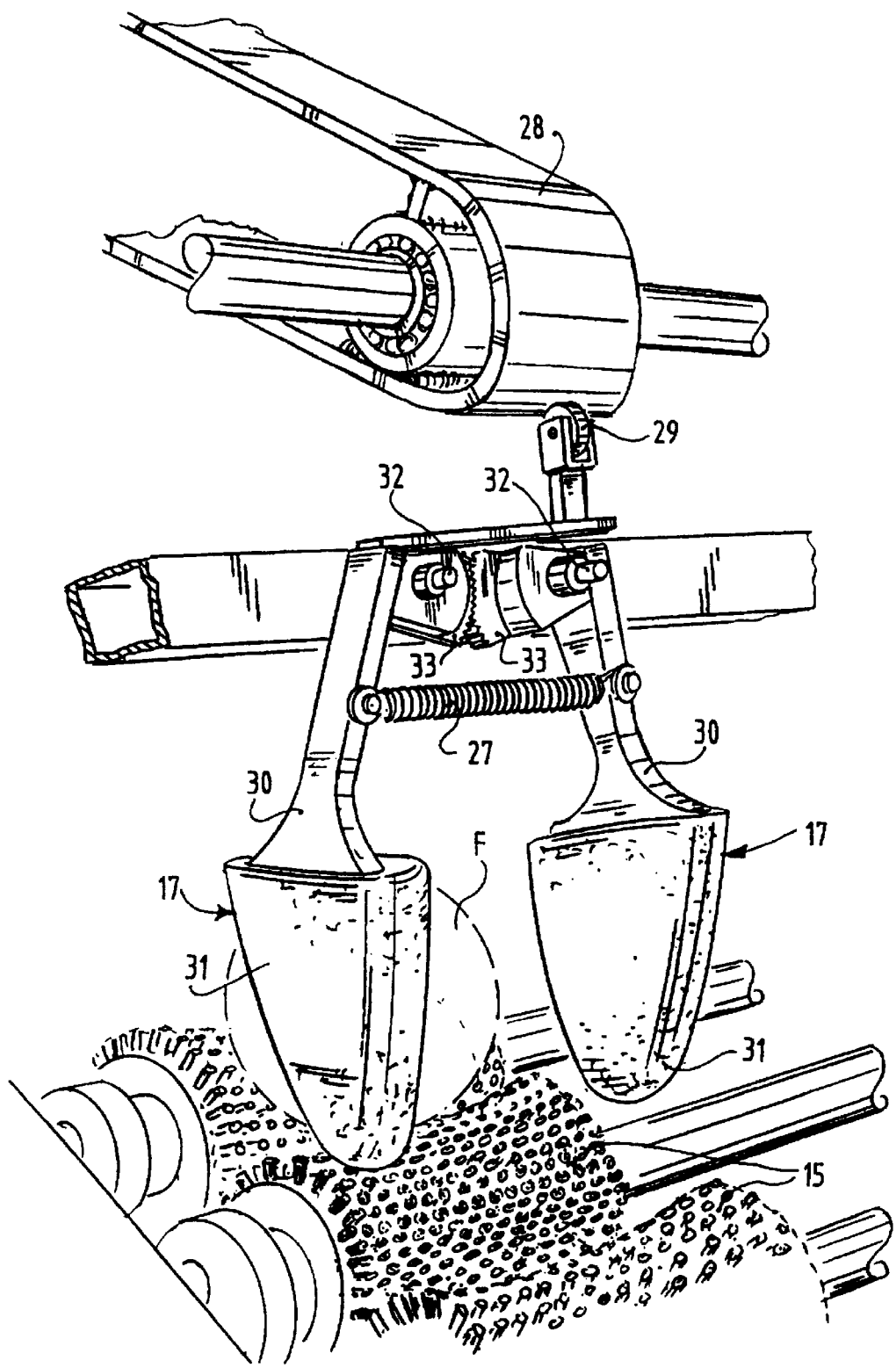
FIG. 3 shows a view in perspective of detail III of FIG. 2.

FIG. 2 also shows clearly that gripper elements 17 are urged toward each other counter to the action of a helical spring 27 using a guide rail 28 and rail tracking wheel 29 (see also FIG. 3) to a position under a relevant fruit F which is as it were scooped out from between the rollers 15.

Grippers 17 (see also FIG. 3) are formed by arms 30 which are coupled by a mutual spring 27 and on which are arranged soft protective sleeves 31 of for instance rubber, rubber-like or plastic material. The substantially stiff arms 30 are each pivotable on a pivot pin 32, wherein the degree of the mutual pivoting movement is linked via toothed wheel sectors 33 which are mutually engaging.

Guide rail 28 pushes the arms 30 apart via tracking wheel 29, whereafter the arms are clamped under the fruit by spring 27. The arms are once again pressed apart above a cup 14 so that the fruit is laid in the cup.

Figure 4:
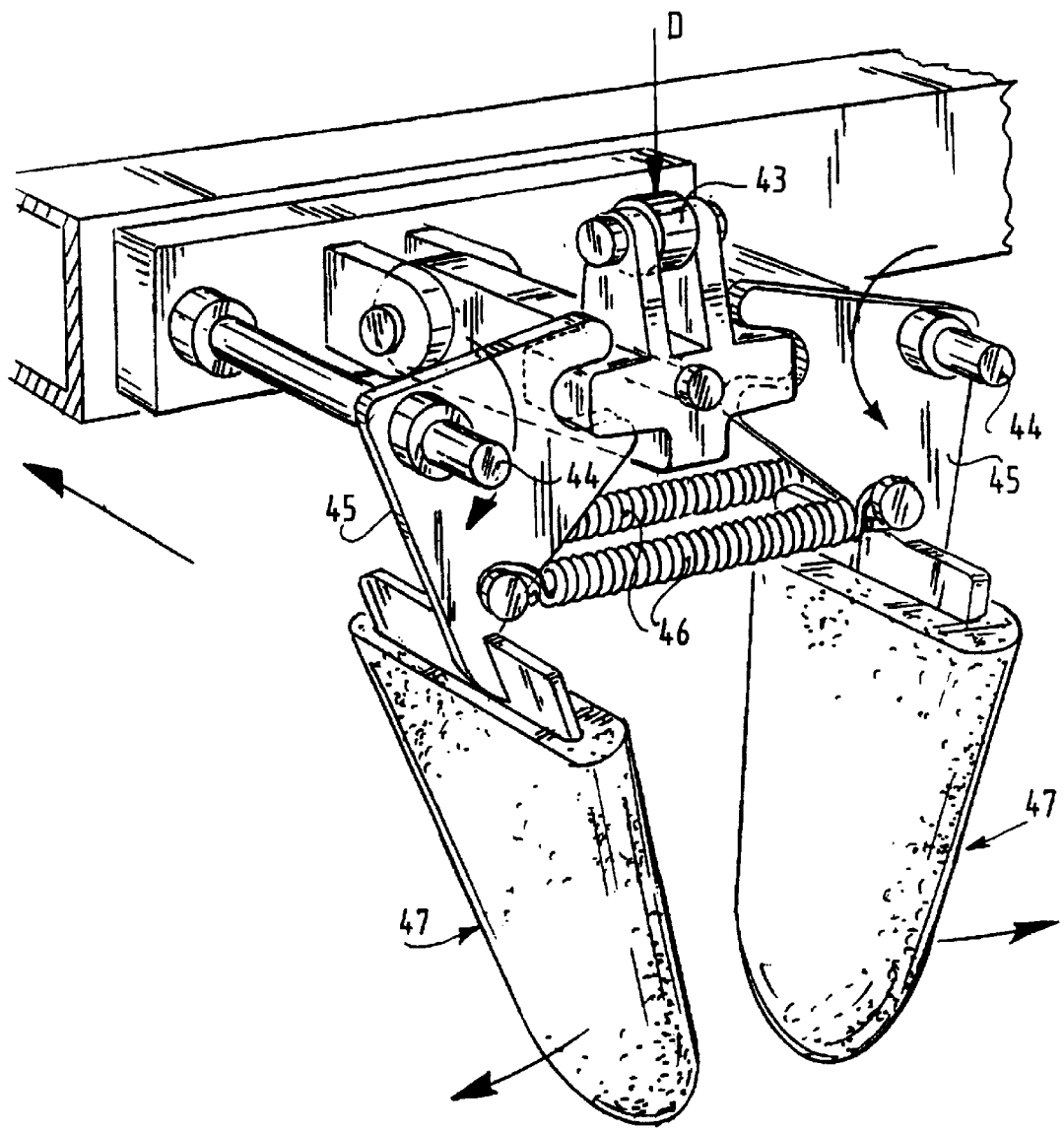
FIG. 4 shows a view in perspective of an alternative embodiment of the element shown in FIG. 3.

In an alternative preferred embodiment as according to FIG. 4, gripper elements 47 are mutually connected with two draw springs 46 arranged on arms 45 pivoting on shaft ends 44, wherein arms 45 are urged apart when a force is exerted in the direction of arrow D on tracking wheel 43, for instance by a cam disc (not shown).

Figure 5:
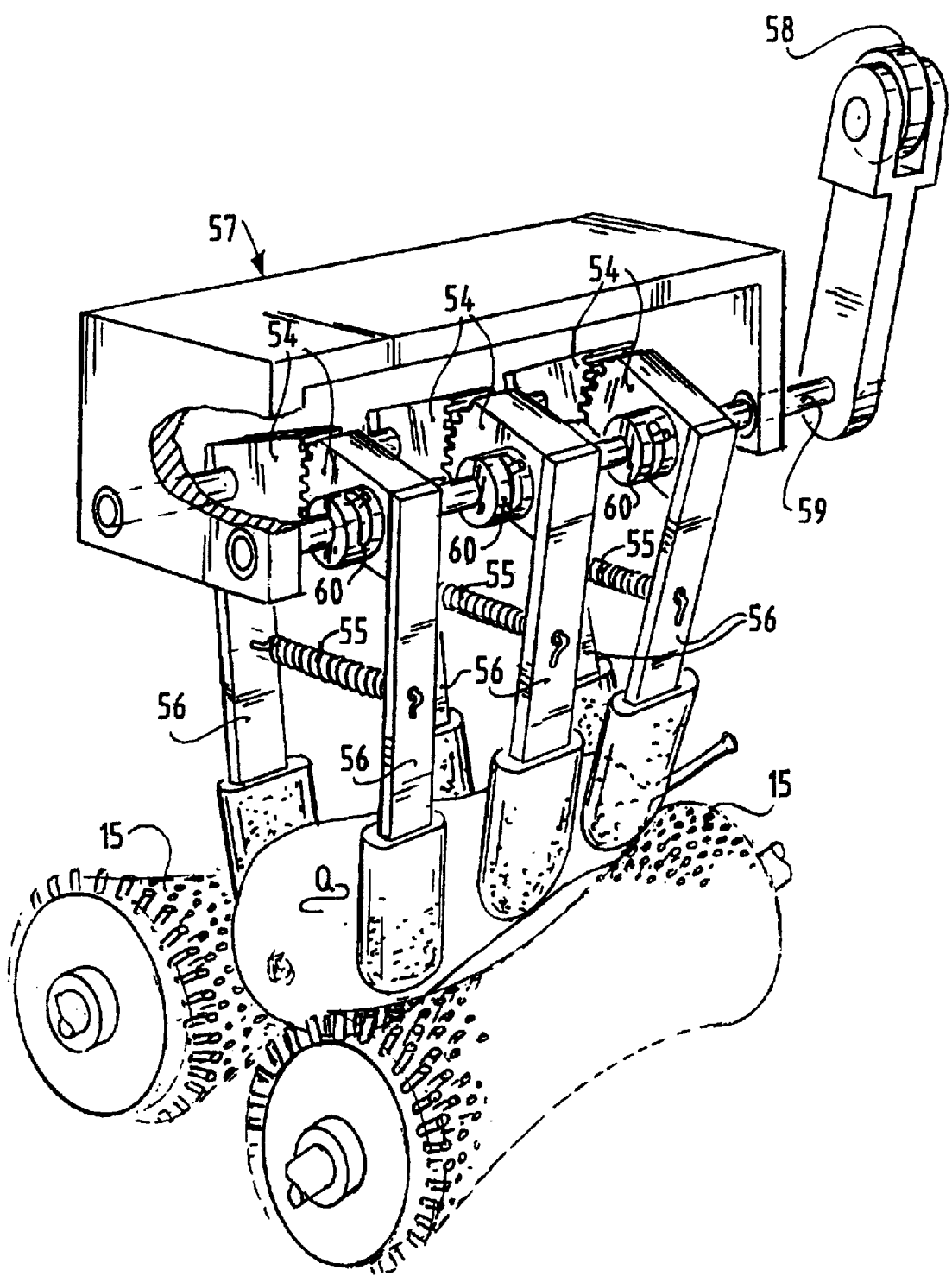
FIG. 5 is a view in perspective of a second alternative embodiment of the gripper element shown in FIG. 3.

A further preferred embodiment of a gripper element 57 (FIG. 5) according to the present invention comprises gripper arms 56 arranged in pairs, for instance for gripping an elongate fruit such as a pear Q. Arms 56 are mutually coupled in pairs using draw springs 55 and are provided on the top with toothed wheel segment 54, wherein the position of the arms 56 is determined in each case in pairs by the thickness at the position of the fruit Q. When arms 56 are urged apart all six must however be moved apart simultaneously when a force is exerted on the rail tracking wheel 58. Respective transmitting elements 60 are arranged for this purpose on shaft 59.

In the preferred embodiments according to the present invention described hereinbelow the fruits are rotated through for instance a half-turn during the transferring process.

Figure 6A:
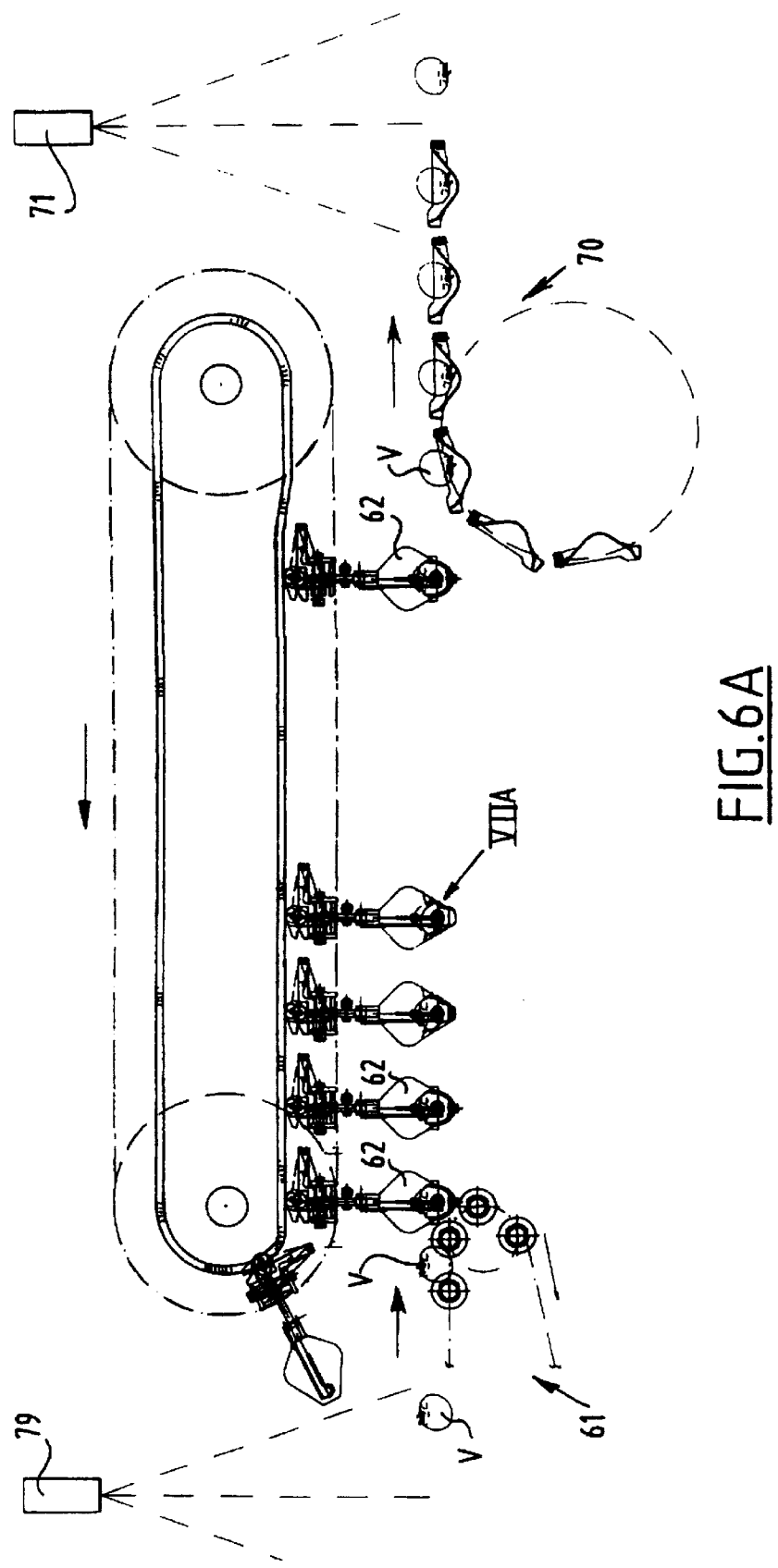
FIG. 6A is a side view of a first preferred embodiment of a further apparatus according to the present invention.

In the embodiment of FIG. 6A fruits V are supplied via a roller conveyor 61, above which is placed a camera 79 for viewing the fruits V, for instance for quality control and/or to determine shape and size. The fruits are gripped by means of gripper arms 62 disposed in pairs and rotated during transfer to a discharge transporting device 70 using an electric motor 80 which causes cup-like elements 66 to turn through for instance about 180°. The cup-like elements engage to the greatest possible extent round the centre line of the fruits.

Figure 8A:
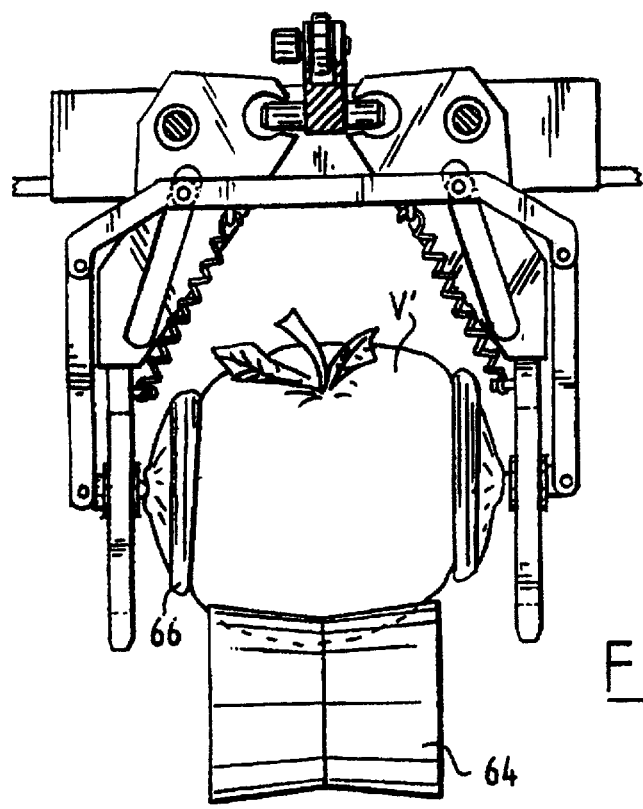
FIG. 8A and 8B show respective front views of the apparatus of FIG. 6B.
Figure 8B:
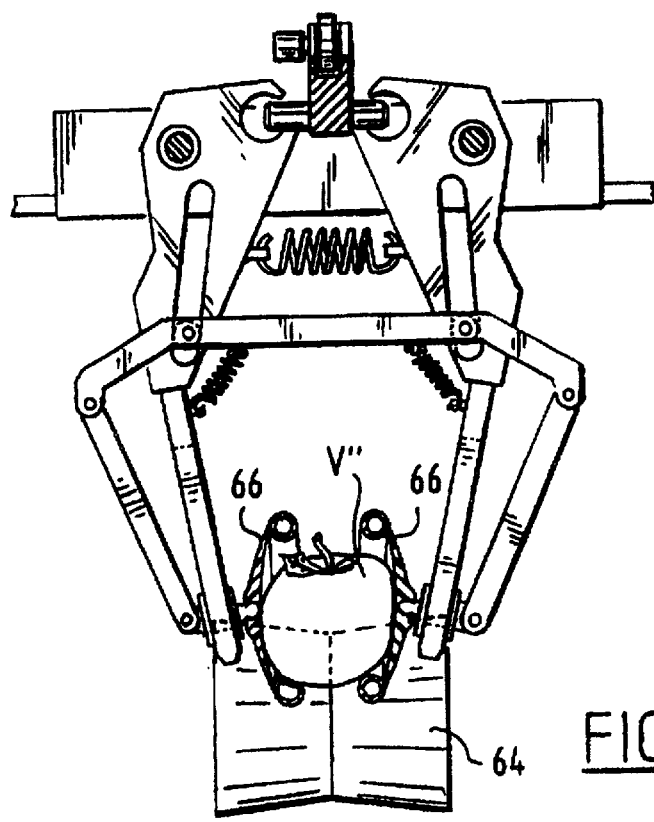

FIG. 8A and 8B show clearly that with dish or cup-like elements 66 both large fruits V' and small fruits V" can be gripped close to their centre line.

Figure 6B:
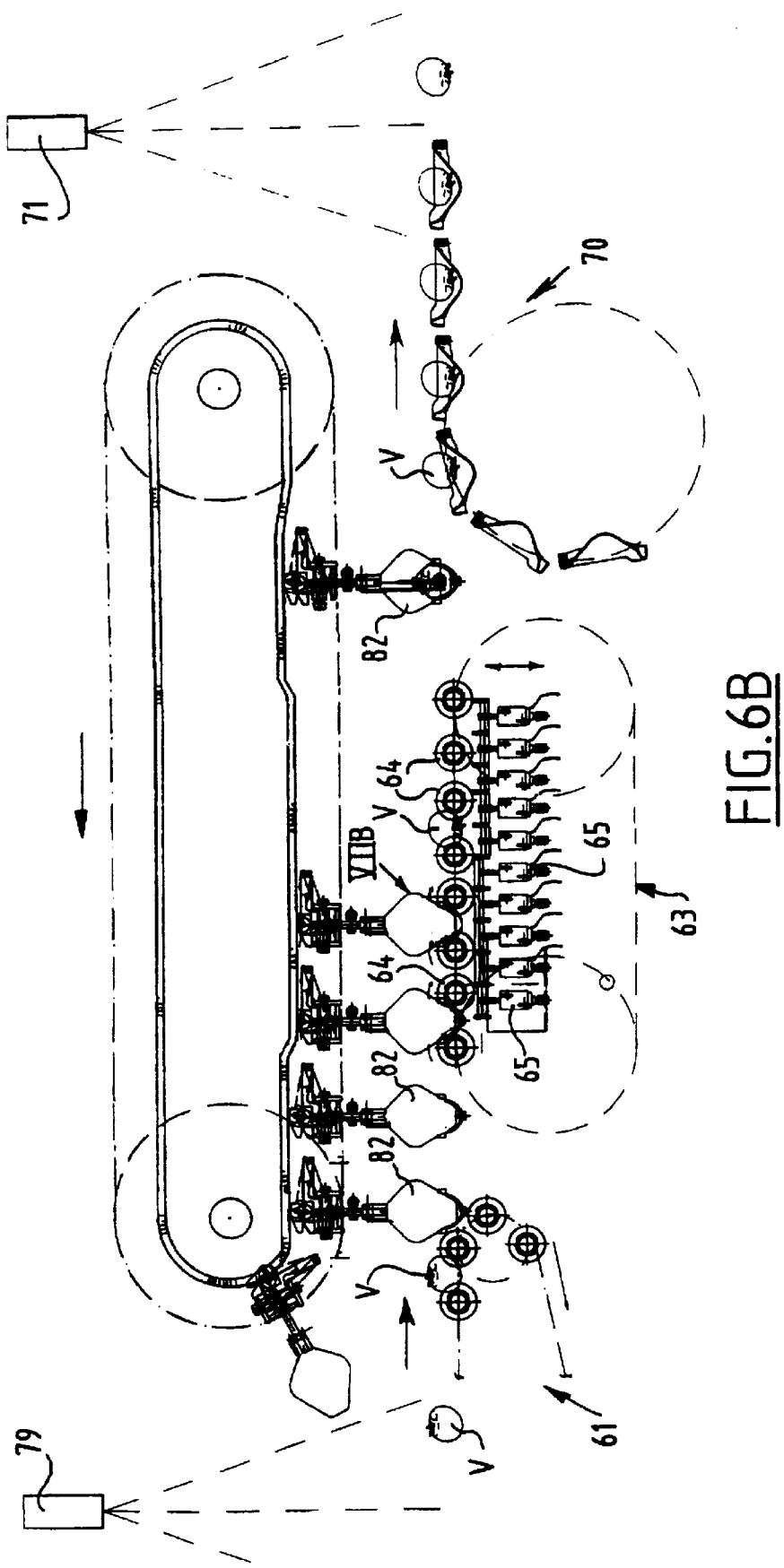
FIG. 6B is a side view of a second preferred embodiment of a further apparatus according to the present invention.

In a second preferred embodiment as shown in FIG. 6B the fruits are removed from a supply conveyor 61 using hands or grippers 82 and transferred to an intermediate conveyor 63, of which rollers 64 can be driven either synchronously or not with the speed of the grippers 82 using drive elements 65.

Figure 7A:
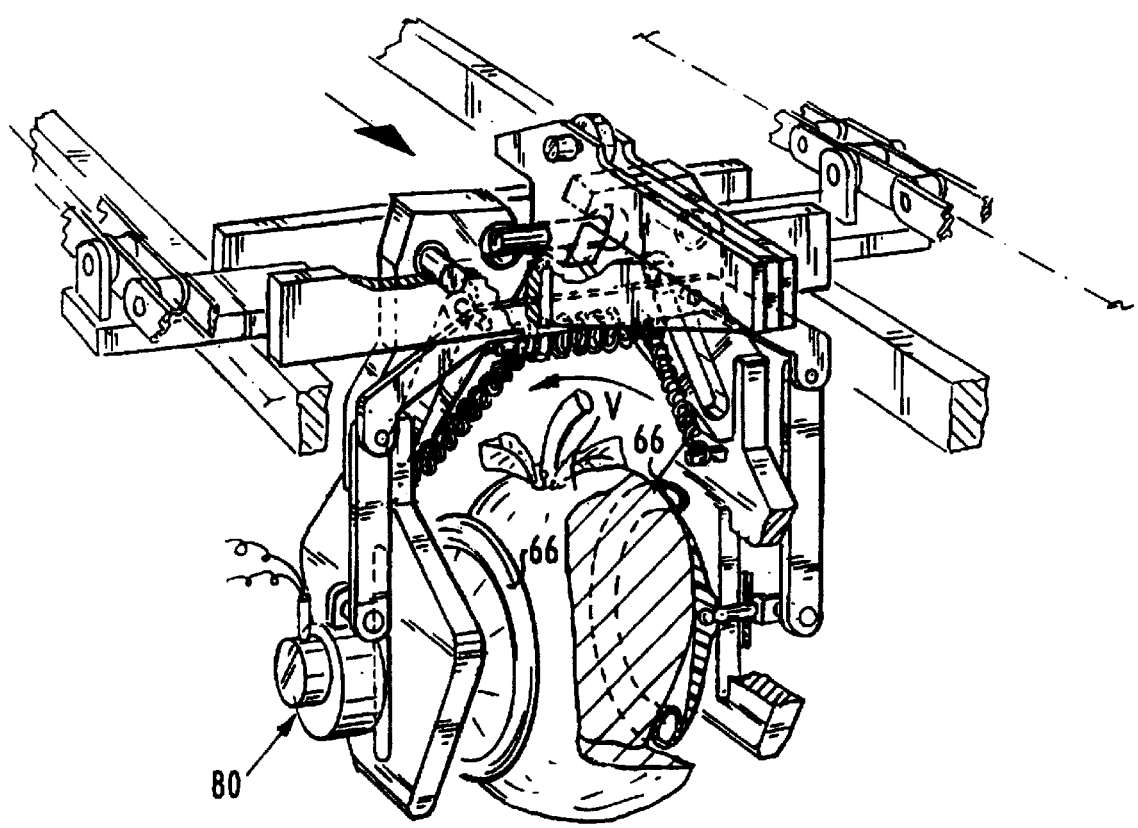
FIG. 7A shows detail VIIA of FIG. 6A.
Figure 7B:
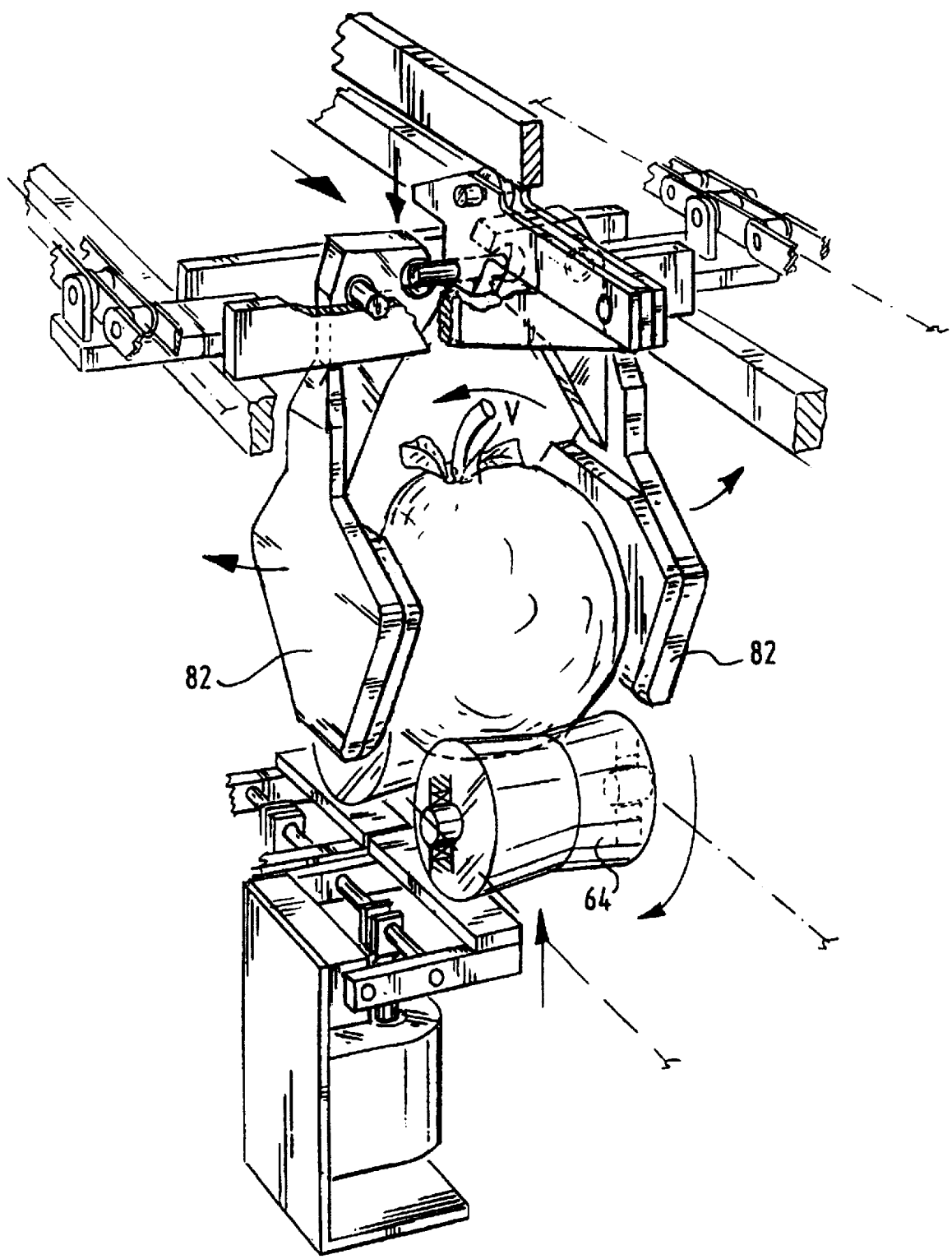
FIG. 7B shows a view in perspective of detail VIIB of FIG. 6B.

As shown in FIG. 7B, the hands 82 are moved slightly outward above roller 64, whereafter the fruits V are rotated approximately through a half-turn by driving two rollers 64 for an adjustable time period.

In both embodiments the fruits V are then transferred to a discharge transporting device 70 using gripper arms 62 respectively 82, above which device is disposed a camera 71 which, after rotation of the fruits through for instance roughly a half-turn, can view the other side of the fruits.

Figure 9:
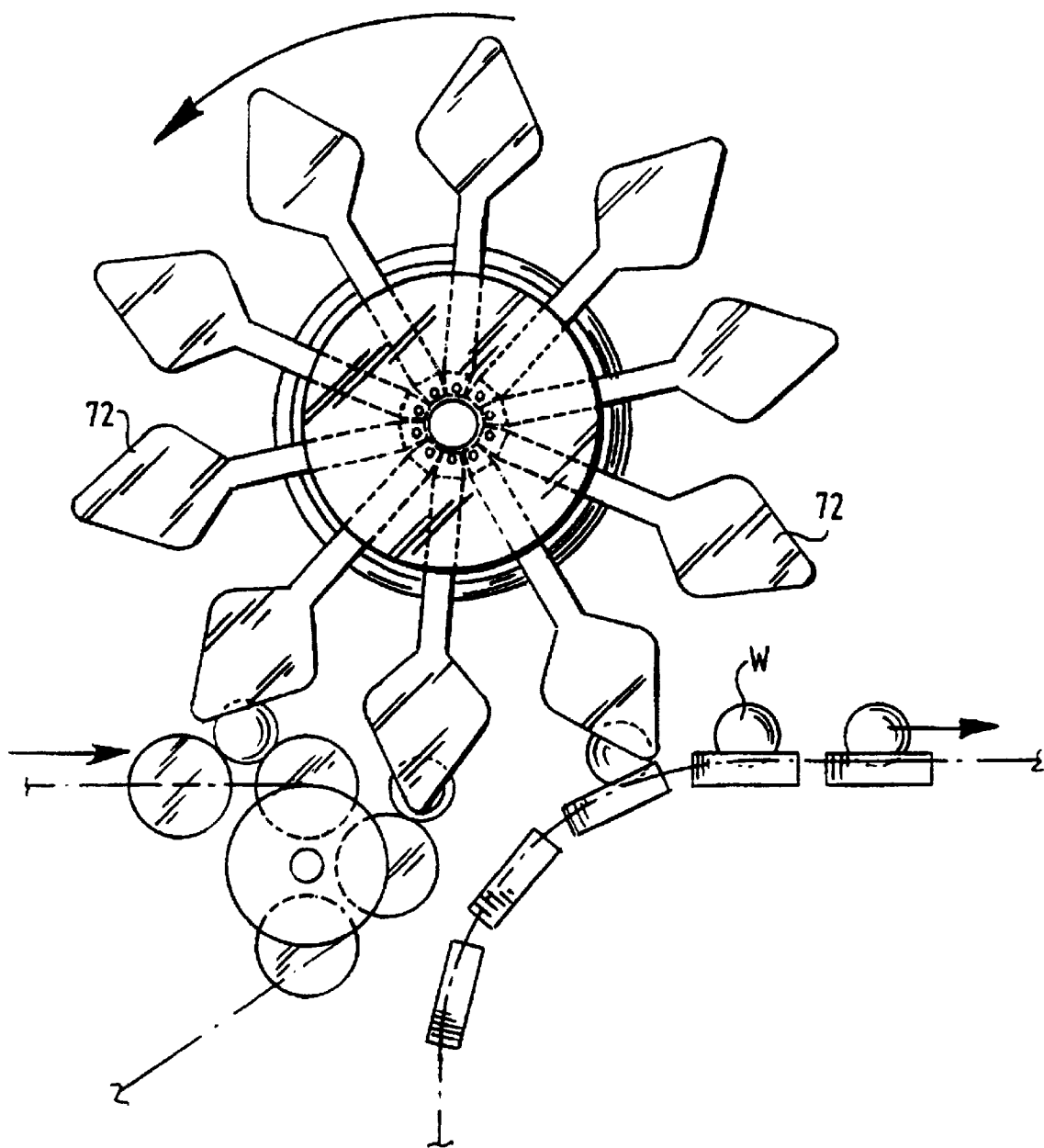
FIG. 9 is a schematic side view of a further preferred embodiment of an apparatus according to the present invention.
Figure 10:
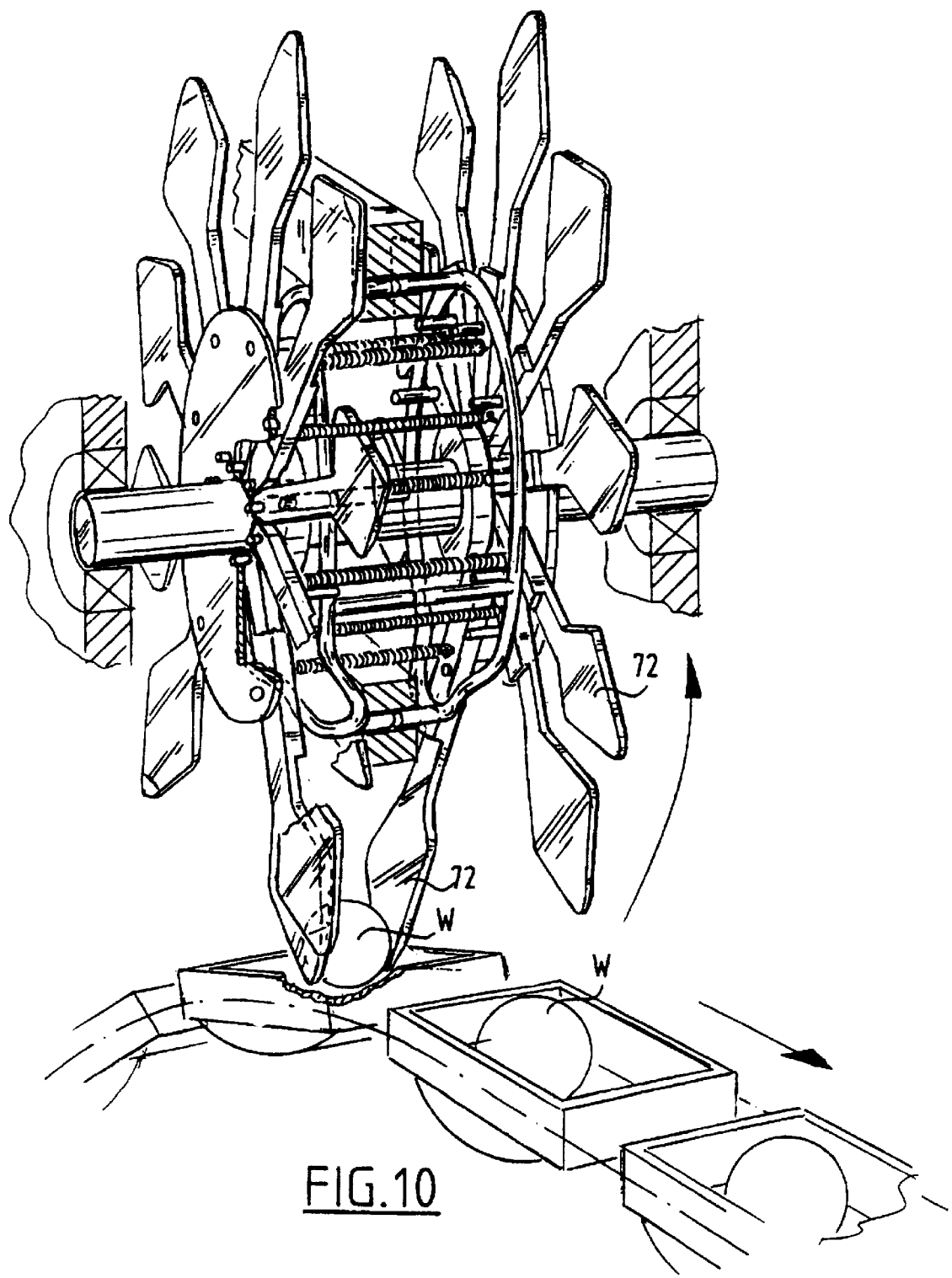
FIG. 10 shows a partly cut away view in perspective of the apparatus of FIG. 9.

In the embodiment according to FIG. 9 fruits W are transferred using gripper elements 72 which are arranged on a central shaft and thus execute a circular movement. It will be apparent that this embodiment of FIGS. 9 and 10 requires a relatively small number of gripper arms, which limits the cost thereof. It would also be conceivable in this embodiment to provide the gripper arms 72 with elements wherein the fruits can be rotated, for instance while passing through a full circle rotation between gripper arms 72, wherein gripper arms 72 must then be rotated approximately at double speed.

The present invention is not limited to the above described preferred embodiments thereof; the rights applied for are defined by the following claims.

What is claimed is:

1. Apparatus for transporting and/or classifying objects such as fruits, comprising:

a supply conveyor, having a first longitudinal axis, for supplying the objects at a relatively small pitch relative to the first longitudinal axis;

a transferring device for transferring the objects from the first conveyor, said transferring device comprising a first reversing wheel at a distal end of the transferring device and gripper members arranged in pairs for gripping the objects; and a discharge conveyor, having a second longitudinal axis, for classifying, such as weighing, and for discharging the objects at a relatively large pitch relative to the second longitudinal axis, the large pitch of the discharge conveyor greater than the small pitch of the supply conveyor, said discharge conveyor having a second reversing wheel at a proximal end of the discharge conveyor, said supply conveyor, transferring device, and discharge conveyor being arranged at substantially the same horizontal level, wherein the speed of the forward movement of the transferring device is synchronized with the speed of the discharge conveyor and of the supply conveyor so that the objects are transferred into the discharge conveyor from the transferring device at or near the respective first and second reversing wheels of the respective transferring device and discharge conveyor and so that discharged objects are spaced apart by the large pitch.

2. Apparatus of claim 1, wherein the supply conveyor comprises a roller conveyor with substantially diabolo-shaped elements.

3. Apparatus of claim 1, wherein the discharge conveyor comprises substantially cup-like receiving members.

4. Apparatus of claim 1, wherein the gripper members comprise substantially stiff arms and protective members of substantially soft material.

5. Apparatus of claim 4, wherein the protective members are sleeves of rubber-like or plastic material.

6. Apparatus of claim 1, wherein the apparatus is provided with at least one cross conveyor arranged below the transferring device.

7. Apparatus of claim 1, further comprising rotating means for causing a fruit to rotate.

8. Apparatus of claim 7, wherein the rotating means comprise a plurality of successively arranged, to a greater or lesser extent braked roller elements wherein the roller elements are proximate the transferring device so that fruit may be brought into operative contact with the roller elements during transfer by the transferring device, and wherein the roller elements are driven for an adjustable time period to effect rotation of the fruit.

9. Apparatus of claim 7, wherein the rotating means comprise an electric motor operatively connected to a respective pair of gripper members so that during transport to the discharge convevor the electric motor may be actuated to effect rotation of the respective pair of gripper members.

10. Apparatus of claim 7, further comprising a plurality of cameras, wherein fruit are viewed by one camera in proximity to the supply conveyor and are viewed by another camera in proximity to the discharge conveyor so that fruit is viewed by respective cameras before and after rotation.

* * * * *